United States Patent [19]

Riley

[11] 3,908,093

[45] Sept. 23, 1975

[54] INTERCOM SYSTEM WITH AN IMPROVED MECHANISM FOR PREVENTING THE INTERRUPTION OF CONVERSATIONS

[75] Inventor: Wayne Riley, Racine, Wis.

[73] Assignee: Webster Electric Company, Inc., Racine, Wis.

[22] Filed: Oct. 18, 1973

[21] Appl. No.: 407,470

[52] U.S. Cl. ............... 179/37; 179/1 H; 179/18 BC

[51] Int. Cl.² ............................................ H04M 9/00

[58] Field of Search ............................... 179/37–40, 179/1 H, 1 HF, 100 L, 18 AD, 18 AB, 1 CN

[56] References Cited

UNITED STATES PATENTS

| | | | |
|---|---|---|---|
| 2,783,308 | 2/1957 | Campbell | 179/37 |
| 3,215,780 | 11/1965 | Beszedics et al. | 179/1 H |
| 3,215,781 | 11/1965 | Yong | 179/1 H |
| 3,243,512 | 3/1966 | Liberman | 179/1 H |
| 3,679,837 | 7/1972 | Liberman | 179/37 |

*Primary Examiner*—Kathleen H. Claffy
*Assistant Examiner*—Brigance Gerald L.
*Attorney, Agent, or Firm*—Mason, Kolehmainen, Rathburn & Wyss

[57] ABSTRACT

Each station in a multi-station, hands-free intercom system is equipped with D.C.-biased audio signal inputs and outputs. D. C. current sensors are connected in series with the inputs and outputs. Switches enable the output of any station to be selectively connected to the input of any other station. The current sensors disable a calling station from transmitting to a called station whenever the call would interrupt a third-party conversation that is in progress at the calling station. The current sensors do not disable the calling station, however, if the called station is switched for communication with the calling station. In this manner, the privacy of conversations is assured. The current sensors may also be used to control the illumination of a "BUSY" lamp or the like at the calling station.

9 Claims, 6 Drawing Figures

INTERCOM SYSTEM WITH AN IMPROVED MECHANISM FOR PREVENTING THE INTERRUPTION OF CONVERSATIONS

BACKGROUND OF THE INVENTION

1. Field of the Invention

The present invention relates to intercom systems and, more particularly, to multi-station "hands-free" intercom systems in which the intercom stations automatically switch between transmitting and receiving modes of operation under voice control and in which provision is made for insuring the privacy of conversations that are in progress.

2. Brief Description of the Prior Art

Numerous systems are known which enable each station in a system of intercom stations to communicate with every other station in the system. Typically, switches are provided at each station which allow an output signal from that station to be transmitted to a signal input of any other stations in the same system. In the simplest of such systems, if two stations attempt to communicate simultaneously with a third station, the third station can receive a composite message that is garbled. Such simple systems may also permit a first station to accidentally interrupt a conversation that is in progress between a second and a third station.

To prevent accidental interruptions and garbled messages, the more sophisticated intercom systems include a mechanism for warning the party at one station that the station he wishes to communicate with is in use. As an example of such a mechanism, the audio input to each station in a system may be clamped to D. C. ground potential whenever the station is in use. The audio output from each station may be biased to a positive D. C. potential and may include a D. C. current sensor. The current sensor may be arranged to give a BUSY indication. Any attempt to place a call to a station that is in use will cause a current to flow from the positively-biased output of the calling station towards the grounded input of the called station and will thus cause the current sensor to give a BUSY indication to the calling party. If desired, the current sensor may also disable the calling station to preserve the privacy of the conversation that is in progress.

Systems of the above type are not entirely satisfactory, however, because they sometimes will give off a false BUSY indication. Suppose, for example, that a first station is left with its output connected to the input of a second station. Any third, fourth, or fifth station in the system which attempts to call the first station will find that the first station is BUSY. Unfortunately, the first station would also be BUSY with respect to the second station, at least insofar as the current sensor within the second station is able to determine. A party at the second station is thus informed that the first station is BUSY when, in fact, the first station is switched to communicate with the second station.

The problem of false BUSY indications becomes serious in the case of hands-free intercoms. Because a hands-free intercom station may be located several feet away from the party using the station, the party can easily forget to return the station to its standby state after use.

Accordingly, a primary object of the present invention is to design into such a system a mechanism which prevents the occurrence of interruptions and simultaneous transmissions to a single station but which does not give rise to false BUSY indications under the circumstances described above. A further object of the invention is to incorporate such a mechanism into a hands-free intercom system without increasing the number of interconnections between stations and without significantly increasing the complexity of the stations in the system.

BRIEF SUMMARY OF THE INVENTION

Briefly described, the preferred embodiment of the invention is embodied in a hands-free intercom system of the type described above. Each station includes an output that is D. C.-biased to a first potential level and an input that is biased to a second potential level when the station output is switched for communication with another station.

In accordance with the invention, D. C. current sensors are associated with both the input and the output of each station. The output current sensor is arranged to disable the station from transmitting and to give off a BUSY indication in response to a flow of current to or from the station output. The input current sensor is arranged to enable the station to transmit and, optionally, to suppress the BUSY indication in response to a flow of current to or from the station input.

When a party at a first station attempts to call a party at a second station, the output sensor checks to see if the second station is busy. If so, then a BUSY indication is normally given to the party at the first station and the station is disabled. However, if the second station has its output switched into connection with the first station, then a current flows between the second station output and the first station input. This current is detected by the input current sensor which reenables the station to function. In this manner, a transmitting station is not disabled when a receiving station is switched for communication with the transmitting station.

In the preferred embodiment of the invention, the station audio inputs and outputs are electrically-floating pairs of wires which are driven at the output end by a transformer and which are connected at the input end to a floating speaker-gain-control assembly. The current sensors are bipolar transistors having their bases connected by resistors to the pairs of wires. The transistors used as input and output current sensors are of opposite polarity types (PNP-NPN or NPN-PNP). The emitter of the output-current-sensing transistors is connected directly to a first potential source, and the emitter of the input-current-sensing transistor is connected to a second potential source through a switch that is closed only when the station output is switched into communication with á station input. A simple logical circuit then senses the flow of current from the transistors and disables the station from transmitting when an output current flow is sensed without a corresponding flow of input current. As an aid to the calling party, a BUSY light is connected for energization by current flowing from the collector of the output-current-sensing transistor.

The detailed description which follows is a complete description of a hands-free intercom system that incorporates the present invention. Further objects and advantages of the invention are apparent in that description. The points of novelty which characterize the invention are pointed out with particularity in the claims annexed to and forming a part of this specification.

BRIEF DESCRIPTION OF THE DRAWINGS

For a better understanding of the invention, reference will be made to the drawings wherein.

DETAILED DESCRIPTION OF THE PREFERRED EMBODIMENT

The preferred embodiment of the present invention comprises an intercom system that includes seven intercom "stations". Each station includes a microphone, a speaker, an amplifier, station control logic, and a control panel which supports station selection switches and other controls. Wire pairs interconnect an input to each station with an output from every other station. Two-way communication between any two stations may be achieved, and as many as three separate conversations may be carried on simultaneously. Provision is made for insuring the privacy of all conversations and for making it impossible for one to eavesdrop, as is fully explained at a later point in this description.

In accordance with the present invention, it is desired to have each station normally kept in a "transmit" mode or state with its microphone operative and its speaker disabled. In response to an incoming communication from another station, it is desired to first disable the station microphone and then, after a brief delay, to present the incoming communication to the station speaker. To achieve these goals, each station is equipped with a fast-acting, voice-responsive switching circuit which disables the station microphone and enables the station speaker in response to an incoming communication from another station. By thus putting each station under the control of incoming communications, it is possible to insure that communication in a first direction cannot be interrupted by an attempt to communicate in the opposite direction.

Figure 6:
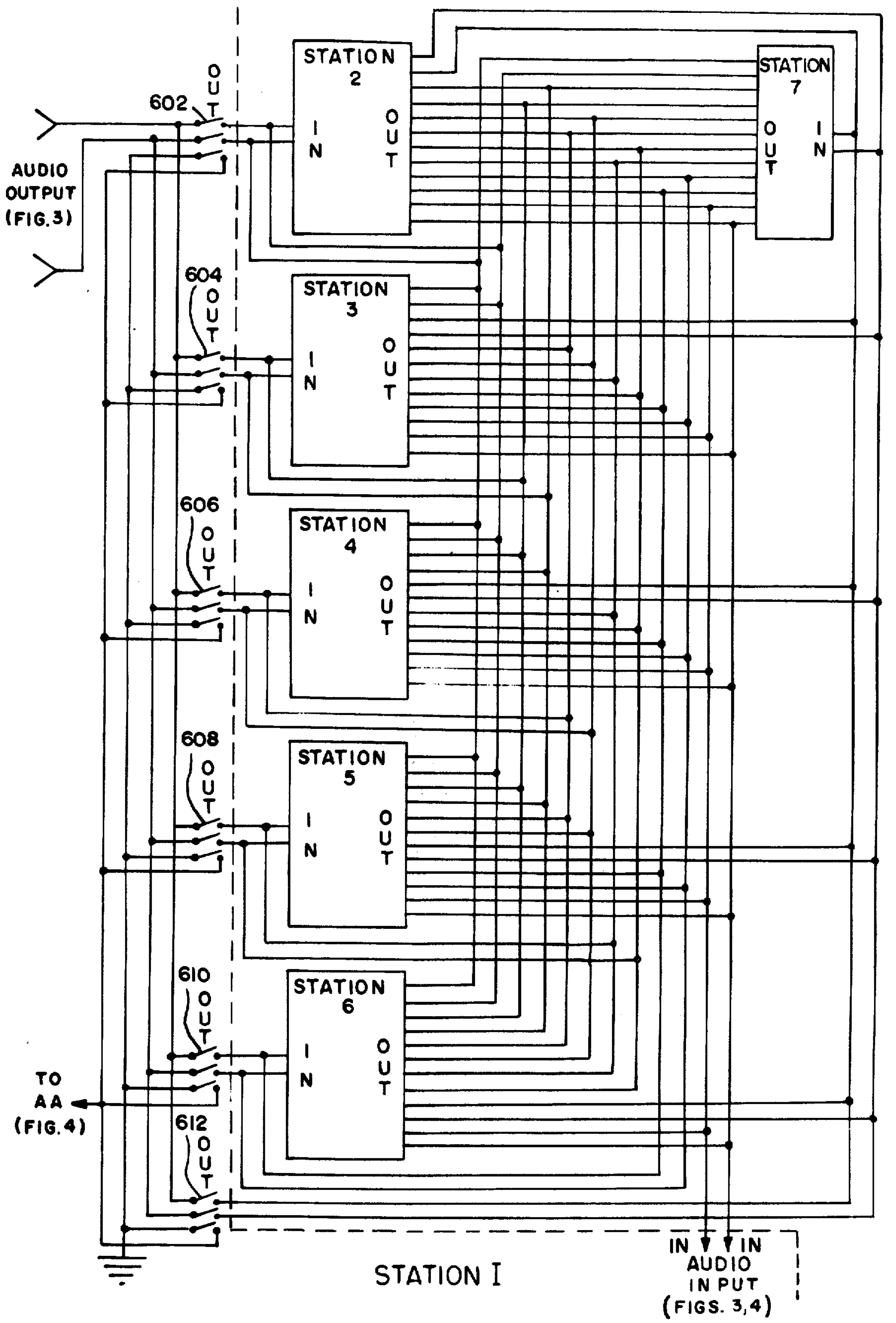
FIG. 6 is a schematic diagram illustrating how the intercom station disclosed in FIGS. 2 through 5 may be interconnected with six other identical stations to form a complete intercom system of seven stations.

FIGS. 2, 3, 4, and 5 together present a schematic diagram of an intercom station which embodies the present invention. For the limited purpose of discussing FIGS. 2 through 5, it may be assumed that two intercom stations are interconnected to form a two-station system in which the output of one station simply feeds the input of the other station directly, and vice versa. At a later point in this discussion, a description of FIG. 6 is presented which explains how a complete network of seven or more stations may be established.

Figures 1, 2:
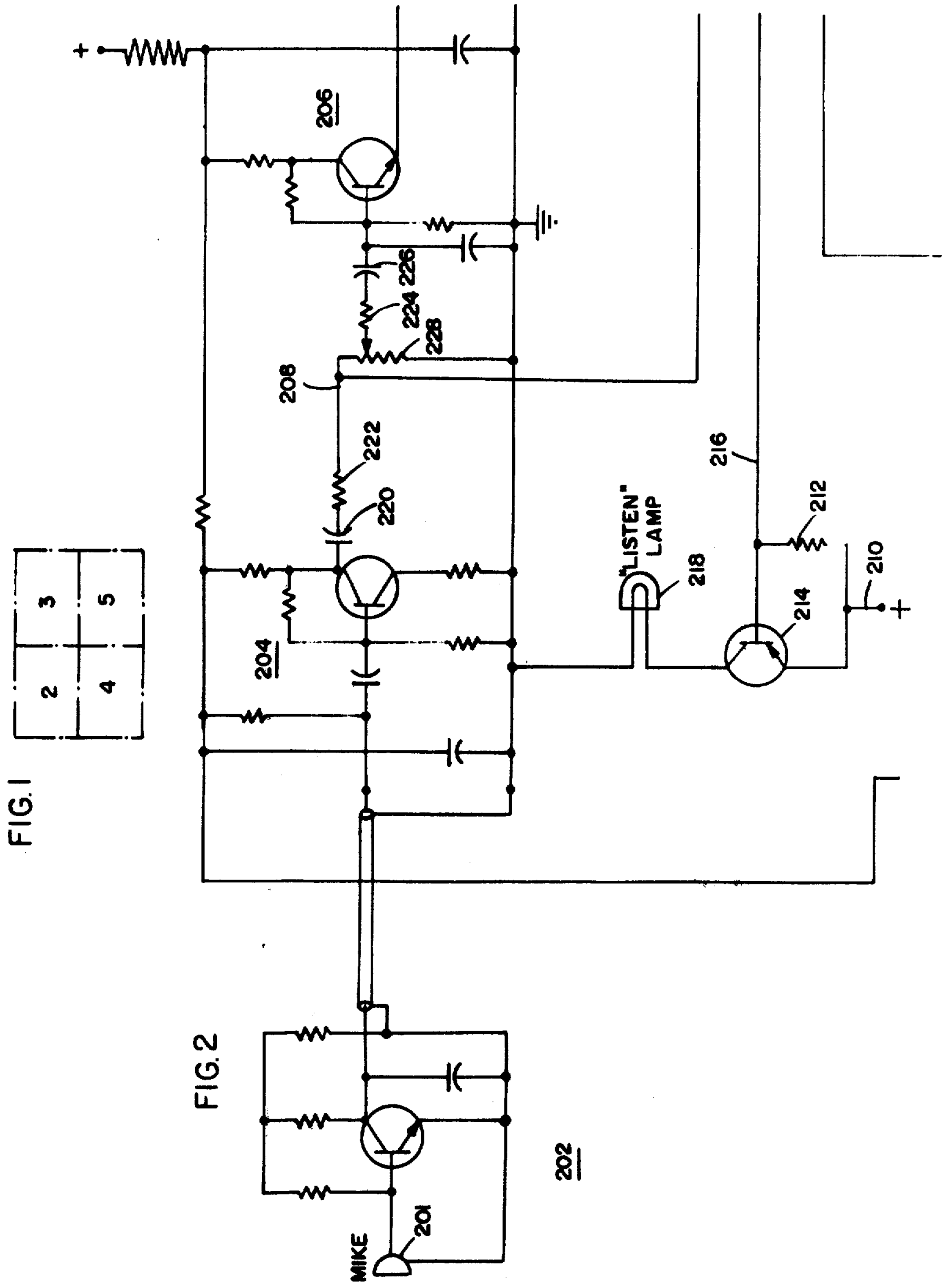
FIGS. 2, 3, 4, and 5, when assembled in accordance with FIG. 1, form a complete schematic diagram of an intercom station designed in accordance with the present invention.
Figure 3:
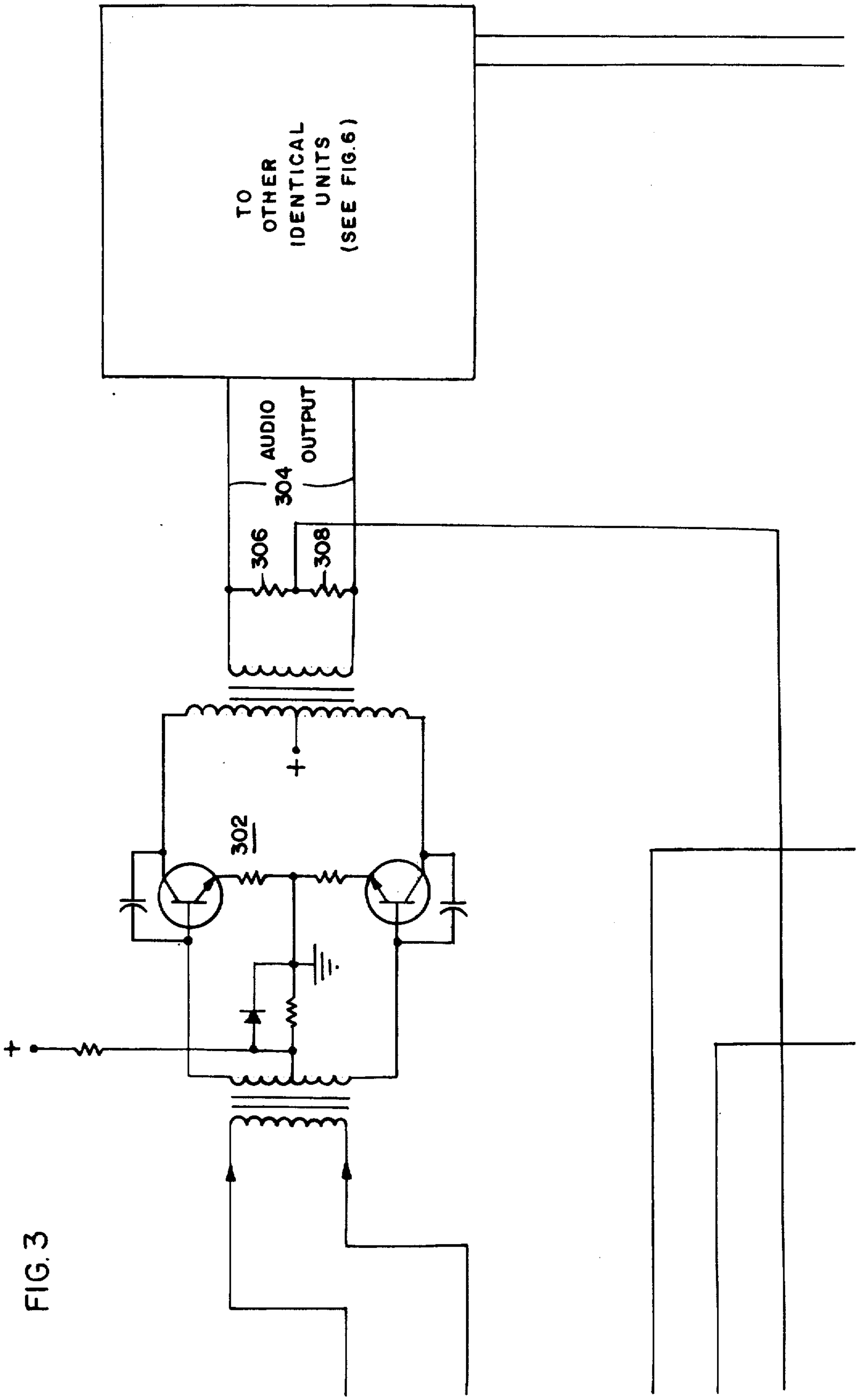

A party wishing to use the intercom speaks into a microphone 201 (FIG. 2). His voice is amplified by a series of amplifier stages 202, 204, 206, and 302 (FIG. 3) and is applied to a pair of lines 304 (FIG. 3) which are labelled AUDIO OUTPUT. An amplified voice signal thus flows over the lines 304 to an identical station located at a remote point. Amplified voice signals, which are returned by the remote station, flow into a pair of lines 506 (FIG. 5) to an audio input of the intercom station. These incoming voice signals flow through an attenuator circuit 502 to a speaker 508. Operation of the speaker 508 is controlled by contacts 510 which are driven by a relay 512. The contacts 510 are normally open and normally disable the speaker 508. A circuit 504 senses when a voice signal is applied to the station's audio input and responds to such a signal by actuating the relay 112 to close the contacts 510. The closure of the contacts is delayed, as will be explained. The circuit 504 thus enables the speaker 508 to operate whenever an incoming voice signal is received from a remote station. The circuit 504 also causes a second relay 514 to actuate contacts 516 which disable the microphone 201 (FIG. 2).

Time-delay devices, associated with each of the two relays 512 and 514, delay the actuation of the relay 514 and the release of the relay 516. These devices insure that the speaker 508 and the microphone 201 are never operative simultaneously. Regenerative feedback or "howl", therefore, cannot possibly be caused by the speaker 508 driving the microphone 201.

The circuit 504 is novel in its details. In brief, the circuit 504 draws very little current during standby operation. The circuit 504 has a Schmitt-trigger characteristic and is able to switch extremely rapidly and cleanly in response to the reception of an incoming voice signal of sufficient magnitude.

The lines 506 apply an incoming voice signal to the outer terminals of a potentiometer 518. A portion of the incoming voice signal is picked off by a transformer 522. A primary winding 520 of this transformer is connected between the potentiometer tap and one side of the potentiometer 518. Incoming voice signals are thus conveyed to a secondary winding 524 of the transformer 522. High frequency components of the incoming voice signal are attenuated somewhat by a capacitor 526 that is connected in parallel with the secondary winding 524. The transformer primary winding 520 presents a relatively high (2,000 ohms) impedance to the lines 506 and thus does not load the audio input significantly.

Incoming voice signals which appear across the secondary winding 524 are rectified by a rectifier. A diode 528 and a capacitor 530 are connected in series with one another to form the recitifier, and the resulting series circuit rectifier is connected across the secondary winding 524 of the transformer 522. Any voice-signal potential fluctuation which appears across the transformer secondary winding 524 is half-wave rectified by the diode 528 and causes a positive charge to be developed across the capacitor 530 proportional to the peak-to-zero magnitude of the signal fluctuation. Due to its small size, the capacitor 530 is able to charge very rapidly, and the circuit 504 thus responds rapidly to incoming voice signals.

The positive potential developed across the capacitor 530 causes current to flow through a resistor 532 and into the base of a transistor 534 which is an emitter-follower amplifier. The transistor 534 acts as a unity-gain voltage amplifier and develops at its emitter electrode a potential that is approximately equal to the potential presented by the capacitor 530.

The two transistors 536 and 538 comprise a bistable configuration which has two basically stable states. Under standby conditions, with no voice signal input to the circuit 504, the transistor 536 is held non-conductive by the transistor 538, and the transistor 538 is held conductive by a small current which flows through the relays 512 and 514 and through a resistor 540. Even though the transistor 538 is conductive, it draws very little current. The collector current of the transistor 538 is kept very low by the fact that the transistor 534, through which the collector current of the transistor 538 must flow, is essentially nonconductive when there is no voice signal entering the circuit 504. The circuitry of the three transistors 534, 536, and 538 thus draws only a miniscule amount of current from the intercom station power supply when the station has no voice signal input from another station. The low standby current drain of the circuit 504 represents an additional advantage of the present invention.

In response to an incoming audio signal, a positive potential develops across the capacitor 530, as has been explained. The emitter-follower transistor 534 applies this positive potential to the upper end of a resistor 544. At this point in time, the transistor 538 is still fully conductive. Hence, the lower end of a resistor 546 may be thought of as shorted to ground by the transistor 538. The two serially-connected resistors 544 and 546 thus form a potential divider connected between the emitter terminal of the transistor 534 and ground. This potential divider applies a portion of the potential developed across the capacitor 530 to the base of the transistor 536.

When the potential across the capacitor 530 rises to a certain level, which is determined primarily by the relative sizes of the resistors 544 and 546, the transistor 536 becomes conductive. Assuming, by way of example, that the transistor 536 requires ½ volt at its base to become conductive; assuming further that the resistors 544 and 546 are of approximately equal value; and assuming still further that there is a ½ volt potential drop between the emitter and base terminals of the transistor amplifier 534; it would then take about 1½ volts of rectified voice signal stored in the capacitor 530 to cause conduction of the transistor 536. If it is further assumed that the potentiometer 518 is set to about mid-range and that the transformer 522 has a voltage gain of 5-to-1 from its primary to its secondary, then the transistor 536 would be rendered conductive by an incoming voice signal having a peak-to-zero-level amplitude of about ½ volt, or a peak-to-peak amplitude of about 1 volt. In other words, somewhat less than ½ volt R.M.S. (root-mean-square) of incoming voice signal is typically required to induce conduction in the transistor 536. The particular input signal level required to cause conduction may be adjusted by varying the setting of the potentiometer 518 so as to give any desired sensitivity to voice signals and insensitivity to non-voice background noise signals.

The circuit 504 utilizes positive feedback to produce extremely rapid switching at the output of the transistor 536. The circuit 504 has a Schmitt-trigger characteristic, although it differs in its layout from that of a classical Schmitt trigger. A pair of resistors 540 and 542 are connected serially between the collector of the transistor 536 and ground. A node 548 common to the two resistors 540 and 542 connects to the base of the transistor 538. When an incoming voice signal is strong enough to produce some conduction in the transistor 536, that conduction causes the potential level at the collector of the transistor 536 to drop. The resistors 540 and 542 apply a portion of this collector potential drop to the base of the transistor 538 and reduce the flow of base current to the transistor 538. When the resistors 540 and 542 are properly selected, even a small conduction of the transistor 536 initiates a reduction in the conduction of the transistor 538, and this in turn reduces the amount of current which flows through the resistor 546. Current which previously flowed out of the resistor 544 and into the resistor 546 is now forced to flow into the base of the transistor 536. This diverted current is amplified by the transistor 536 and increases the collector current of the transistor 536. This increased collector current causes the collector potential of the transistor 536 to drop more rapidly, and this rapid decrease in collector potential further decreases conduction in the transistor 538. An unstable, positive-feedback loop is thus created which rapidly renders the transistor 536 fully conductive and the transistor 538 is fully nonconductive. Depending upon the characteristic of the collector load of the transistor 536 and depending upon the switching time of the transistor 536 and 538, it is possible to have the transistor 536 switch from no conduction to full conduction in a time interval that may be extremely brief. Practically speaking, and insofar as voice signal distortion is concerned, the switching action of the transistor 536 is effectively instantaneous.

The collector load for the transistor 536 comprises the relays 512 and 514 which are connected essentially in parallel with one another. Current which flows through the collector of the transistor 536 originates at a positive potential node 210 (FIG. 2) and flows through either a resistor 212 or through the emitter-base junction of a transistor 214 to a line 216. From the line 216, the current divides in FIG. 5 between two paths. Part of the current flows through a resistor 550 and the relay 512, and part flows through a diode 552 and the relay 514.

The transistor 536 is rendered conductive by an incoming audio signal. When the transistor 536 first becomes conductive in response to such a signal, its collector goes to ground potential and effectively grounds the collector line 554. The size of the resistor 212 is small enough so that the line 216 remains at or close to the intercom B+ supply potential. Essentially the entire B+ supply voltage of the intercom station is applied between the lines 216 and 554 when the transistor 536 is fully conductive. Under the impetus of this potential, current flows through the diode 552 and immediately energizes the relay 514, thus causing the contacts 516 to close. The contacts 516 connects a node 208 (FIG. 2) to ground potential when they close. The node 208 is located in the voice signal path that connects the amplifier stages 204 and 206 together. The contacts 516, when closed, prevent any voice signal from flowing out of the amplifier stage 204 and into the amplifier stage 206. Speech picked up by the microphone 201 is thus prevented from ever reaching the output signal lines 304.

Current flowing through the diode 552 also rapidly charges a capacitor 556 to almost the full B+ supply potential. At this point in time, the capacitor 556 serves no useful purpose. The purpose of the capacitor 556 is to delay the opening of the contacts 516 at a later time when the relay 514 is de-energized in response to the cessation of any voice signal input, as is explained fully at a later point.

When the transistor 536 becomes conductive, current also flows from the line 216 to the line 554 through a resistor 550 and through the elements 512, 558, 560, and 562. Initially, most of this current flows through the diode 558 and charges the capacitor 560. As the capacitor 560 charges, more and more current flows through the relay 512. After a time delay, the length of which delay is established by the sizes of the resistor 550 and capacitor 560, the current flow through the relay 512 becomes strong enough to actuate the relay 512 and to close the contacts 510. The resistor 550 and capacitor 560 thus slow the initial closing of the contacts 510 and prevent the speaker 508 from receiving any voice signal input before the contacts 516 have disabled the microphone 201. The resistor 550, the capacitor 560, and the diode 558 together from a time-delay device which delays the actuation of the relay 512 in response to conduction of the transistor 536.

When the voice signal input from another station terminates, the circuit 504 disconnects the speaker 508 from the incoming signal and reconnects the microphone 201 to the audio output lines 304. The capacitor 530 discharges slowly enough to prevent the circuit 504 from responding to a momentary cessation of the incoming voice signal. If the cessation is sufficiently long so that the capacitor 530 discharges itself, then the circuit 504 responds by rendering the transistor 536 nonconductive and by deactivating the relays 512 and 514.

A Zener diode 564 keeps the base of the transistor 534 from going more positive than about 6 volts. A resistor 566 limits dissipation in the transistor 534 collector and also limits the amount of current which may flow through the transistor 534. The Zener diode 564 provides a quick discharge path for current from the capacitor 530 in cases of abnormally high audio input signals. The Zener diode partially equalizes the "release" time of the circuit 504 for voice signals which differ widely in amplitude from one another. Without the Zener diode 564, it would typically require longer for the circuit 504 to release the relays 512 and 514 following a strong voice signal input than it would for the circuit 504 to release following a weak voice signal input.

It was noted above the circuit 504 renders the transistor switch 536 conductive in response to less than ½-volt R.M.S. of audio input signal. Due to the Schmitt-trigger characteristic of the circuit 504, it is necessary for the audio input level to fall substantially below this level before the transistor 536 becomes nonconductive. More specifically, the transistor 538 is nonconductive when the transistor 536 is conductive. The transistor 538 therefore does not draw current through the resistor 546 when the transistor 536 is conductive. In order to stop conduction of the transistor 536 in the absence of current flow in the resistor 546, it is necessary for the rectified potential across the capacitor 530 to drop to a low enough level so that the emitter of the transistor 534 drops below the normal conduction potential of the base of the transistor 536. Typically, the potential across the capacitor 530 might have to drop to about 0.05 to 0.2 volts before the transistor 536 is rendered partially nonconductive.

Once the transistor 536 is rendered partially nonconductive, the transistor's collector terminal goes positive and allows current to flow through the resistor 540 and into the base of the transistor 538. This current flow renders the transistor 538 conductive. The transistor 538 draws current through the resistor 546 and thus diverts additional current away from the base of the transistor 536, thus reinforcing the cut-off of the transistor 536. The circuit 504 thus quickly switches from a conductive to a nonconductive state in response to the potential across the capacitor 530 dropping below about 0.05 to 0.2 volts. The time which it takes for the circuit 504 to switch back into is nonconductive state following cessation of a voice signal input is simply determined by the sizes of the resistors 532 and 544 and the capacitor 530 used in constructing the circuit. In the preferred embodiment of the invention, this release time is adjusted to approximately 1 second.

The transistor 536 thus ceases to conduct when the voice signal input terminates. In response to this cessation of conduction of the transistor 536, current through the relay 512 immediately ceases, and the contacts 510 immediately open. The capacitor 556 sustains current flow through the relay 514 for a brief time interval and thus delays the opening of the contacts 516 until after the contacts 510 have opened. The capacitor 556 effectively keeps the microphone 201 out of service until after the speaker 508 has been disconnected from the voice signal input, and thus prevents regeneration which might otherwise occur. The capacitor 556 and the resistance of the relay 514 cooperate to determine how long the contacts 516 are held open. The elements 514, 552, and 556 thus cooperate to form a time-delay device.

After the contacts 510 and 516 have opened, a resistor 562 discharges the capacitor 560. The capacitor 514 is discharged by the relay 514. A pair of diodes 552 and 558 prevent their associated capacitors 556 and 560 from sustaining current flow through the relay winding 512 after the transistor 536 has become nonconductive and from thereby preventing the contacts 510 from closing promptly before the contacts 516 close.

The speaker 508 is connected between one end and the tap of a volume control potentiometer 580. The volume control potentiometer 580 is connected in series with a resistor 582 across the voice signal input lines 506. A second resistor 584 is connected across the input lines to provide a relatively constant load to the remote station. The setting of the potentiometer 580 may be adjusted to regulate the level of the sound delivered by the speaker 508 without affecting the switching sensitivity setting of the station Assuming that the station illustrated in FIGS. 2 through 5 is called station A and is connected to an identical station B without the aid of the switching circuit shown in FIG. 6, the normal mode of operation is to have the microphones 201 in both stations normally active and the speakers 508 in both stations normally disabled. The switching circuit 504 in both stations is normally in a nonconductive state and the relays 512 and 514 are normally de-energized. If a party A begins talking into the microphone 201 in station A, his voice is amplified by the amplifier stages 202, 204, 206, and 302 and is applied as a voice signal to the audio output lines 304. The voice signal flows to the audio input of station B over the signal lines 506 but is momentarily unable to reach the speaker 508 in station B because the contacts 510 are open. However, the circuitry 504 in station B responds almost instantaneously to the incoming voice signal by actuating the relays 514 and 512 in rapid sequence. The relay 514 disables the microphone in stage B and the relay 512 connects the stage B speaker to the incoming voice signal.

Current flows over the line 216 (FIGS. 2 & 5) in station B and causes the transistor 214 to become conductive. The transistor 214 illuminates a "LISTEN" lamp 218. The lamp 218 signals to a party B at station that his unit is in the listen mode of operation and is temporarily unable to transmit voice signals back to the station A. The party A is thus able to send a verbal message to the party B, and the party B is prevented from interrupting that verbal message until the party A stops talking.

When the party A stops talking, the circuit 504 in the station B responds after about a second by opening the contacts 510 and 516 and by extinguishing the LISTEN lamp 218. Both the station A and the station B are then returned to their normal standby states with their speakers disconnected but with their microphones in active operation.

It is thus apparent that either party A or party B may speak into his microphone at any time and commence talking to the other party without the need to depress a "push to talk" push button or to take any other action. The other party may respond as soon as the first party stops talking. There is never any possibility of acoustic feedback.

In case both parties A and B start talking almost simultaneously, the circuits 504 in the two stations determine which party gains control of the intercom system and has his voice transmitted. Whichever circuit 504 responds first to an incoming voice signal, that circuit 504 prevents its own station from transmitting a voice signal back to the other station. That circuit 504 also connects its station's speaker to the incoming voice signal from the other station. The party who gains control of the system talks into his microphone, has his voice conveyed to the other party, and does not hear the other party talking into his microphone. The party who does not gain control of the system does not have his voice transmitted. He hears the voice of the party in control coming from his speaker, and he normally will cease talking until the party in control of the system stops talking.

Situations sometimes arise when the party A may wish to interrupt the party B. A switch 586 (FIG. 5) is provided which permits such an interruption to take place. Assume, for example, that party A is talking to party B and that party B wishes to interrupt the party A. The party B simply actuates the switch 586 at the station B and diverts the audio input to his station away from the speaker 508 and into a dummy-load resistor 588. The circuit 504, which no longer is receiving an audio input signal, disconnects the speaker 508 from the incoming audio signal and reconnects the microphone 201 to the signal lines 304 through the input amplifier stages. The party B is then free to talk to the party A even before the party A has finished his message. When the party A hears the party B talking, the party A knows that his communication has been interrupted and will normally wait until the party B has finished speaking before resuming his end of the conversation.

The microphone 201 and its associated amplifier stages 202, 204, 206, and 302 are conventional in design and, therefore, need not be described in detail. The node 208 which the contacts 516 short to ground whenever the microphone 201 is to be disabled is simply an inter-stage signal node point. This node is coupled to the output of the amplifier stage 204 by an A. C. coupling capacitor 220 that is connected in series with a resistor 222. The node 208 is also connected to ground by a potentiometer 228 which serves as a volume control for the microphone 201. The tap of the potentiometer 228 is connected to the input of the amplifier stage 206 by an A. C. coupling capacitor 226 that is connected in series with a resistor 224. The purpose of the two capacitors 220 and 226 is to prevent any D. C. potential from reaching the node 208 and inducing a transient when the contacts 516 open or close. The capacitors 220 and 226 freely allow audio signals to flow out of the amplifier stage 204 and into the amplifier stage 206 whenever the contacts 516 are open.

The intercom station shown in FIGS. 2 through 5 is designed so that it may be used in a network of any desired number of similar stations to provide two-way communication between any desired pair of stations. In the preferred embodiment of the invention, and referring now to FIG. 6, each intercom station is provided with a plurality of output switches 602, 604, 606, 608, 610, and 612 which allow the station intercom to feed its audio output signal to the audio input of any desired station in the system. For example, the audio output from the station 1 is fed to the input of the station 2 whenever the switch 602 is closed. In addition to routing audio signals, each switch 602, 604, etc. also grounds a signal line AA when it is actuated. This signal line, which appears at the bottom of FIG. 4, illuminates a "key" lamp whenever it is grounded and signals that one of the output switches has been thrown. The key lamp warns those adjacent the intercom that they are no longer assured of privacy. When all of the switches 602, 604, etc. are open, none of the remotely located stations may eavesdrop on conversations which are taking place at the station 1.

One output from each of the remote stations may be connected to the audio input of every other station in a system, as is illustrated in FIG. 6. Any station is thus able to send a message to every other station at any time. If a party at station 1 wishes to call a party at station 2, he simply throws the switch 602 and speaks into the microphone at station 1. His voice then flows from the speaker at station 2. However, the party at station 1 cannot listen in on events at station 2 until some party at station 2 throws the station 1 switch so as to permit the transmission of station signals back to station 1.

It is undesirable to have a party at one station interrupt a conversation between parties at two other stations. To prevent this from happening, the audio amplifier stage 204 within each station is normally disabled by having a transistor 406 short the amplifier stage's positive power supply terminal to ground. A resistor 410 supplies current to the base of a transistor 406 and normally keeps the transistor 406 conducting. When a party places a call, the switch 602, 604, etc. that the party throws to initiate the call grounds the signal line AA and connects the base of the transistor 406 to ground through a relatively high-ohmage resistor 408. Whereas previously the transistor switch 406 was kept in a conductive state by current flow through the resistor 410, now the base of the transistor 406 is held close enough to ground potential by the resistor 408 so as to render the transistor 406 nonconductive. The transistor 406 ceases shorting out the power supply for the amplifier stage 204, and the amplifier stage 204 begins to function.

If the station that is called is not talking to some other station, then the audio input to the called station is essentially floating and is not connected to ground potential. More particularly, and referring now to FIGS. 4 and 5, the audio input to the called station is completely isolated from ground except for a connection through a pair of resistors 420 and 422 to the base of a transistor 424. The emitter of this transistor 424 is connected to the line AA. The emitter-base junction of this transistor 424 is also bypassed by a resistor 426. If the called station is not in service, the switches 602, 604 . . . (see FIG. 6) in the called station are all open and the line AA is floating and is not grounded.

The significance of the floating audio input to the called station is that so long as the called station audio input is floating no D. C. current can flow from the calling station to the called station over the audio output lines 304 of the calling station. If such a D. C. current could flow it would be sensed by the circuit 402 which would reactivate the transistor 406. Since no such current flows when the called station is not in service, the amplifier stage 204 within the calling station remains operative and permits a party at the calling station to talk into the microphone 201 and to have his voice conveyed to the called station.

If the called station is busy when a call is placed, one of the switches 602, 604, . . . etc. in the called station is thrown so that the signal line AA in the called station is grounded. The audio input to the called station is then biased to ground potential, since current may flow from the audio input lines 506, through the resistors 420, and 422, through the transistor 424 and the resistor 426, and over the signal line AA to ground. When an attempt is made to send a message to such a busy station, current flows from a positive supply node 428 in FIG. 4 of the calling party's station, through the emitter-base junction of a transistor 416 and through a parallel resistor 418, through a resistor 414 and a diode 412, and through either or both of the transistors 306 and 308 to the calling station's audio output signal lines 304. This current flows to ground by way of the called station's audio input signal lines 506. As a direct result of this flow of current, the transistor 416 is rendered conductive and applies a positive potential to a busy lamp 430. In addition, the transistor 416 effectively connects a line 432 to the positive supply potential at 428. Current then flows over the line 432 and through a pair of serially-connected resistors 434 and 436 to the base of the transistor 406. This current flow renders the transistor 406 once again conductive. The transistor 406 again shorts out the power supply for the amplifier stage 204 and disables the microphone 201. The transistor 416 thus senses that the called station is busy and prevents one speaking into the microphone 201 from interferring with whatever conversation is in progress at the called station. In this manner, the intercom system is designed to make it impossible for one party to accidentally interrupt a conversation between two other parties by attempting to place a call to one of the other two parties.

If a calling party places a call to a station that is not busy, it has already been explained that he may do so and he may then speak into the microphone 201 and have his voice conveyed to the speaker at the called station. The calling party is unable to "eavesdrop", however, until somebody at the called station acknowledges the call by throwing the switch 602, 602, etc. at the called station which corresponds to the calling station.

When a party at the called station does throw that switch, both stations are interconnected by their respective calling switches. The lines AA in both stations are then connected to ground and the audio input of each station is then connected to ground by the resistors 420, 422, and 426. Current, therefore, flows towards ground from the audio output of each station. This current flow to ground causes the transistors 416 in each station to become conductive and to illuminate the busy lamp 430 in each station. The transistors 416 attempt to prevent each station from transmitting by sending a positive potential through the resistors 434 and 436, as was just explained. However, current now flows from the audio input of each station into the base of the transistor 424 in each station. This current flow causes the transistor 424 to become conductive. The transistor 424 effectively grounds the junction point between the two resistors 434 and 436 in each station and thus preventing the transistor 416 in each station from turning on the transistor 406 and from thereby disabling the amplifier stage 204 in each station. In brief summary, when two stations are switched to communicate with one another, conduction of the transistor 424 renders the transistor 406 nonconductive and allows power to reach the amplifier stages 204. Two-way communication is thus allowed to take place even through both stations are busy.

Figure 4:
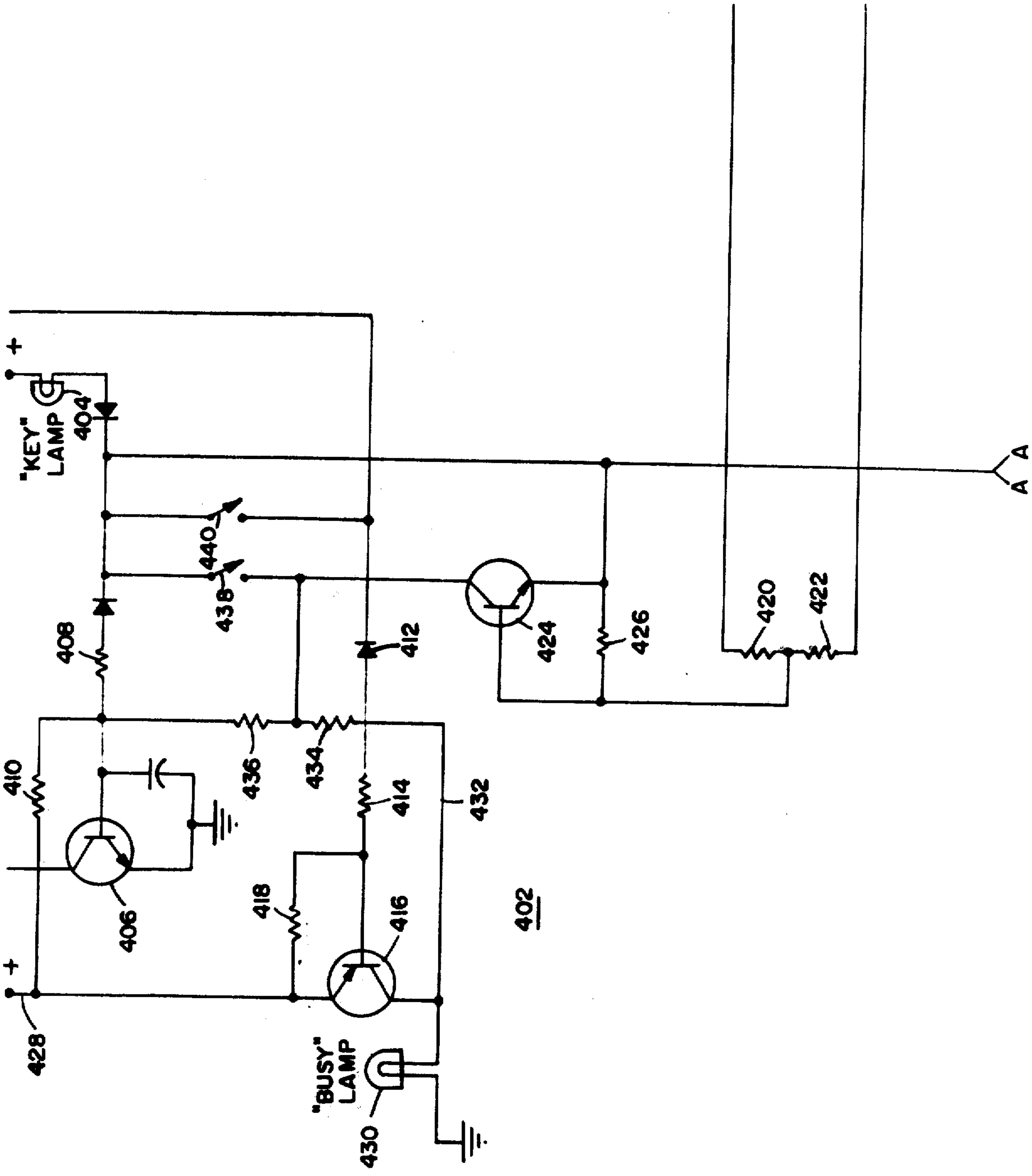
Figure 5:
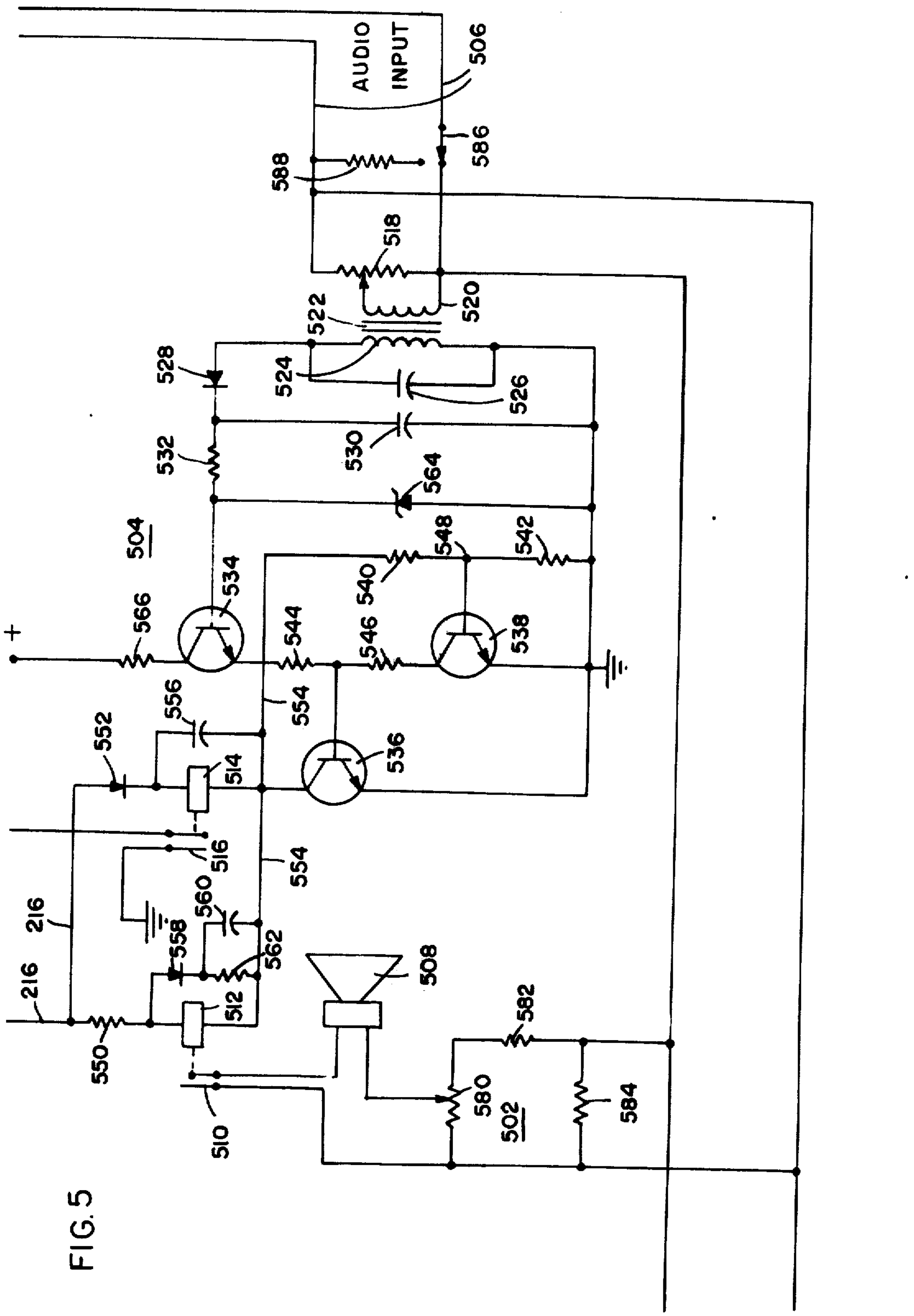

To briefly review the functioning of the circuit elements shown in FIG. 4: The transistor 406 normally disables the amplifier 204 because of current flow through a resistor 410. When a call is placed, the switch 602, 604, etc. which initiates the call grounds the terminal AA and causes the resistor 408 to effectively short the base of the transistor 406 to ground and thus places the amplifier stage 204 into operation. However, if the called station is busy, then current flow in an outward direction over the calling station output lines renders a transistor 416 conductive and causes current flow through a pair of resistors 434 and 436 to again turn on the transistor 406 so that the amplifier stage 204 is disabled to prevent an interruption of conversations which are occurring. The busy lamp 430 also comes on at this time. If the called station is not busy, the calling party is free to communicate with the called station by talking into the microphone 201 because the transistor 416 then does not turn on the transistor 406. If a party at the called station responds by throwing one of his switches 602, 604, etc. that correspond to the calling station, then the busy lamp transistors 416 in both stations become conductive and attempt to turn off the amplifier stages 204 in both stations by sending current through the resistors 434 and 436 to the bases of the transistors 406. However, the fact that the calling and the called stations are switched to communicate with each other means that a D. C. current causes conduction of the transistors 424 in both stations. These transistors ground a node that is common to the resistors 434 and 436 within each station and thus prevent the disabling of the amplifier stage 204 by transistor 406. Two-way communication may then take place between the two stations. The circuitry just described insures the privacy of the stations for eavesdropping, allows one station to call any other station that is not busy, prevents one station from interrupting conversations carried on between other stations, and permits private two-way communication between any two stations within the system.

Sometimes it is desirable for a party at one station to interrupt a conversation that is carried on between two other stations. This may be done by throwing a switch 438 that appears in FIG. 4. When this switch is thrown, the node common to the two resistors 434 and 436 is held at ground potential whenever any one of the switches 602, 604, etc. in the station is thrown. The stage 204 is, therefore, kept continuously operative whenever these two switches are thrown. A party may then speak into the microphone 201 and have his voice conveyed to a remote station. This voice signal actuates the circuit 504 at the remote station and thus interrupts whatever conversation was taking place at the remote station. A switch 440 does not normally participate in intercom operations. It facilitates the use of a paging amplifier with the intercom system, but it is not relevant to the present invention.

In the preferred embodiment of the invention, the switch 586 (FIG. 5) and the switches 438 and 440 (FIG. 4) are all ganged together to form a single push-button control. The resulting push-button control is called the "override" switch since its primary function is that of overriding the normal talk-listen-busy mechanism of the intercom system.

By way of example and not by way of limitation, the following component values were used in constructing the preferred embodiment of an intercom station:

| REFERENCE NUMBER | COMPONENT |
|---|---|
| 212 | 68 ohm resistor |
| 214 | 2N 3645 transistor |
| 220 | 0.47 microfarad capacitor |
| 222 | 5,100 ohm resistor |
| 224 | 5,100 ohm resistor |
| 226 | 0.47 microfarad capacitor |
| 228 | 5,000 ohm potentiometer |
| 306, 308 | 100 ohm resistors |
| 406 | 2N 3566 transistor |
| 408 | 2,400 ohm resistor |
| 410 | 330,000 ohm resistor |
| 412 | 1 ampere diode |
| 414 | 51,000 ohm resistor |
| 416 | 2N 3645 transistor |
| 418 | 5,100 ohm resistor |
| 420, 422 | 1,000 ohm resistors |
| 424 | 2N 3566 transistor |
| 426 | 10,000 ohm resistor |
| 434, 436 | 51,000 ohm resistors |
| 512, 514 | reed relay switches |
| 518 | 2,000 ohm potentiometer |
| 522 | transformer (1:5 step-up; 2,000 ohm primary. Webster Electric Company part No. 211-46443) |
| 526 | 0.02 microfarad capacitor |
| 528 | 1 ampere diode |
| 530 | 0.33 microfarad capacitor |
| 532 | 75,000 ohm resistor |
| 534, 536, 538 | 2N 3566 transistors |
| 540 | 51,000 ohm resistor |
| 542 | 3,300 ohm resistor |
| 544, 546 | 2,200 ohm resistors |
| 550 | 1,000 ohm resistor |
| 552 | 1 ampere diode |
| 556 | 1 microfarad capacitor |
| 558 | 1 ampere diode |
| 560 | 0.47 microfarad capacitor |
| 562 | 10,000 ohm resistor |
| 564 | 6.2 volt Zener diode |
| 566 | 10,000 ohm resistor |
| 580 | 200 ohm potentiometer |
| 582 | 24 ohm resistor |
| 584 | 51 ohm resistor, 1 watt |
| 588 | 51 ohm resistor, 1 watt |

In an alternate embodiment of the invention, an annunciator system (not shown) is added to each station. This annunciator system simply signals visually when an attempt is made to communicate between two stations and is not novel. In such a system, it is unnecessary to permit verbal communication between a calling station and a called station until the called station is switched to communicate with the calling station. The resistors 408 and 434 may then be omitted, and a 5,100 ohm resistor may be used at 436. The resulting system does not permit any inter-station verbal communication until two stations are switched to communicate with each other.

While there has been described the preferred embodiment of the invention, it is to be understood that numerous modifications and changes will occur to those who are skilled in the art. It is, therefore, intended by the appended claims to encompass all such modifications and changes as come within the true spirit and scope of the invention.

What is claimed as new and desired to be secured by Letters Patent of the United States is:

1. An intercom system including a plurality of stations each having a voice signal input channel and a separate voice signal output channel and each including channel switching means for connecting the voice signal output channel of the station to the voice signal input channel of another station at times when it is desired to establish voice communication between the two stations, wherein the improvement comprises:

a first node at a first potential and a second node at a second, different potential within each station;

at least one first current-conductive path connecting said first node to the voice signal output channel of each station;

at least one second current-conductive path connecting said second node to the voice signal input channel of each station;

a first current flow sensor connected in series with said first current-conductive path and having a signal output at which a signal appears in response to any flow of current over said first current-conductive path between said first node and said voice signal output channel;

a second current flow sensor connected in series with said second current-conductive path and having a signal output at which a signal appears in response to any flow of current over said second current-conductive path between said second node and said voice signal input channel;

means associated with the channel switching means for breaking said second conductive path at times when the switching means is not connecting a station's output channel to the input channel of another station so that a flow of current over said second conductive path can only occur when the station is busy communicating with some other station; and means responsive to a signal output from the first current flow sensor and the absence of a signal output from the second current flow sensor for preventing the station from supplying a voice output signal to its voice signal channel output, thereby preventing a first station from transmitting a voice signal to a second station that is busy but permitting the first station to transmit when the apparently-busy second station is switched for communication back with a first station and is thus not truly busy.

2. A system in accordance with claim 1 wherein each station further includes means for giving off a BUSY indication in response to the signal output from the first current flow sensor.

3. A system in accordance with claim 1 wherein said voice signal input and output channels comprise pairs of conductors and wherein each station includes four current-conductive paths, one path connecting said first node to each of the voice signal output channel conductors and one path connecting said second node to each of the voice signal input conductors.

4. A system in accordance with claim 1 wherein the current flow sensors in each station comprise a pair of bipolar transistors each having its emitter and base terminals connected in series with one of said conductive paths, and means for biasing said transistors so that the current flow sensor signal output appears at the collector of each transistor.

5. An intercom system including a plurality of stations each having a voice signal input and a voice signal output and each including switching means for establishing a connection between the station voice signal output and the voice signal input to any of several stations, said interconnection being capable of carrying a D. C. current in addition to a voice signal, wherein the improvement to each station comprises:

a first node at a first potential and a second node at a second, different potential within each station;

first means for establishing a current-conductive connection between the station's voice signal output and the first node;

second means for establishing a current-conductive connection between the station's voice signal input and the second node at times when the station is in use;

first current sensing means for generating a busy indication signal within a station in response to a net D. C. current flow between the voice signal output of the station and the first node; and second current sensing means for defeating the generation of said busy indication signal within a station in response to a net D. C. current flow between the voice signal input of the station and the second node, which current flow may indicate that a called station is not busy communicating with a third party station but is attempting to communicate with the calling station.

6. A system in accordance with claim 5 wherein each station includes means for preventing transmission from a station output in response to the busy indication signal.

7. A system in accordance with claim 5 wherein said first means comprises at least one resistive element and wherein said second means comprises a series circuit which circuit includes at least one resistive element and at least one manually-actuatable switch.

8. A system in accordance with claim 7 wherein said switch is mechanically coupled to the switching means by mechanical coupling means for closing said switch whenever said switching means connects the station output to the input of some other station.

9. A multi-station intercom system comprising:

a plurality of stations;

a selection means associated with each station for establishing a voice signal communications channel between the station and another station under the control of a human operator which channel is also suitable for conveying non-voice signals;

means within each station for supplying a first signal such as a D. C. supply-potential signal to a channel established by the station's selection means to signal an attempt to communicate with the station at the other end of the channel;

means within each station, placed into operation when the station is in use, for supplying a second signal such as a ground-potential signal to channels established by other stations and extending to the station, said second signal informing all such other stations that the station is busy;

means within each station responsive to the receipt of a second busy signal for normally preventing the station from transmitting voice signals over a channel which the station has established to another station that is busy; and means within each station responsive to the receipt of a first signal for permitting the station to transmit voice signals in spite of the fact that the station may be receiving a second signal to thereby permit the station to communicate with another station that appears to be busy but that is actually adjusted for return communication.

* * * * *